Feb. 3, 1959    H. J. HOMER ET AL    2,872,350
GASEOUS DEPOSITION OF TUNGSTEN CARBIDES
Filed July 1, 1955
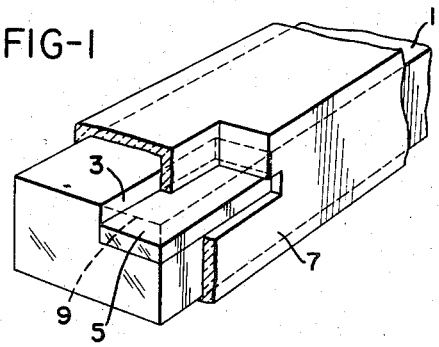
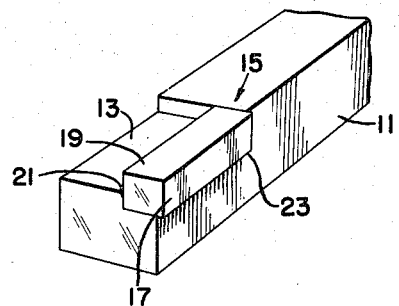
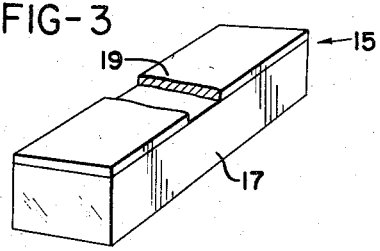
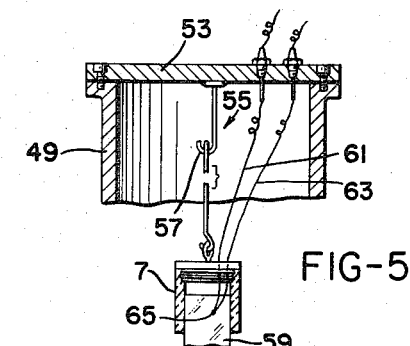
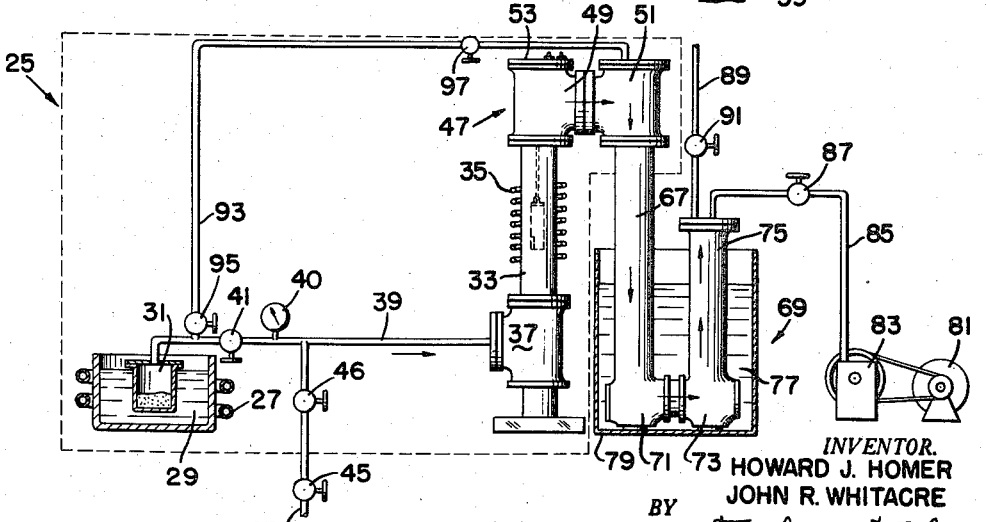
INVENTOR.
HOWARD J. HOMER
JOHN R. WHITACRE
BY
Toulmin & Toulmin
ATTORNEYS

United States Patent Office 2,872,350
Patented Feb. 3, 1959

2,872,350

GASEOUS DEPOSITION OF TUNGSTEN CARBIDES

Howard J. Homer and John R. Whitacre, Dayton, Ohio, assignors to The Commonwealth Engineering Company of Ohio, Dayton, Ohio, a corporation of Ohio Application July 1, 1955, Serial No. 519,532

2 Claims. (Cl. 117—106)

This invention relates to tungsten carbide, to new methods for the production thereof and particularly to cutting tools including carbide tipped cutting tools embodying the tungsten carbide produced in accordance with the methods of invention.

Tungsten carbide is a hard, somewhat brittle substance which has been used alone or in combination with other materials in machining operations where the carbide serves as a cutter. Customarily the carbide is formed by casting or sintering into an "insert," "blank," "piece" or "tip" which is carried on a tool shank. This shank is suitably of a tool grade steel and high-carbon steel, high-speed steels and the Stellites are known to the industry as useful in this connection.

The carbide "tips" as the carbide pieces will be referred to hereinafter are normally brazed to the tool shank and care must be taken to avoid misalignment of the carbide piece with respect to the shank. Also since brazing temperatures in some instance are quite high—well in excess of 1000° F.—a hazard exists that the shank itself may be softened permanently by the brazing operation.

The carbide tip must have sufficient body to withstand the normal handling incident to its formation, shipment, and operations such as that of brazing as well as of cutting use; it is a primary object of this invention to provide a tungsten carbide tip in which a portion of the tip is replaced by other materials such as tool steel, the tip itself having only a very thin layer of carbide thereon.

It is an important object of this invention to provide the tungsten carbide on the shank directly—without a brazing operation.

It is a particular object of this invention to describe a novel method for the attainment of tungsten carbide.

In essence the invention contemplates the production of tungsten carbide from heat decomposable, gaseous tungsten carbonyl. It has been found that tungsten carbonyl which is normally in crystal form and readily sublimable may be decomposed thermally to form tungsten carbide or tungsten carbide together with tungsten metal, the latter being present in a minor quantity and generally less than 10% by weight of the product. The control of the presence of tungsten is attained by control of the pressure of the atmosphere in which the carbonyl decomposes, low pressure favoring the attainment of tungsten in minor proportion and higher pressures favoring the tungsten carbide formation.

The temperature which occasions the decomposition of the carbonyl and formation of the tungsten carbide should be at least 600° F. Higher temperatures accelerate the rate of deposition of the carbide from the carbonyl and at 1000° F. the plating rate is materially higher than at 600° F. being roughly 5 or 6 times greater.

The tungsten carbide may be deposited directly onto the tool itself in which event the remainder of the tool is appropriately masked to inhibit carbide deposition on portions of the tool where it would have no utility. The deposition may be also carried out on shaped sections of a base metal and the composite product later secured to a tool shank. The former procedure has the advantage of eliminating the securing operation and the securing means while the latter procedure provides for facile replacing of the cutter when such becomes worn.

The extent, that is the physical dimensions of the deposit is dependent upon the specific nature of the tool involved and the work which it is to preform. The adherence of the deposit to the base is however good and the material coheres well and accordingly the deposit may be readily selected to perform a required machining function whether the same involves a heavy cut or light finish milling, for example.

The invention will be more fully understood by reference to the following detailed description and accompanying drawings wherein:

Figure 1 is a perspective view of a tool shank produced in accordance with the invention;

Figure 2 is a perspective view illustrating a further embodiment of the invention;

Figure 3 is a perspective view with portions broken away and illustrates a tip in which the carbide is provided on a metal base;

Figure 4 is a schematic view of apparatus useful in the method of invention; and Figure 5 is an enlarged view of a portion of the structure of Figure 4.

Referring to the drawings the numeral 1 in Figure 1 indicates a tool shank which may be straight carbon steel; Stellite or high-speed cutting steels may be utilized. The shank 1 is provided with recess 3 which gives support against both side and end thrust to a body of carbide 5.

The carbide body 5 is deposited in accordance with the invention from gaseous tungsten carbonyl as will be more fully described in connection with Figure 4. The numeral 7 designates a masking member which is provided over all of the surface except that on which the carbide is deposited; this mask is of course removed when the tool is used. Such a mask may most suitably be a glass which softens above about 1000° F.

The dotted line 9 plus the body 5 indicates the outline of the position which the usual carbide tool would occupy and it will be noted that the same is somewhat larger than the carbide 5 positioned in accordance with this invention.

Referring briefly to Figure 2 the tool shank 11 is provided with a rabbeted recess 13. The tool body 15 (Fig. 3) comprises a base 17 of low carbon steel for example, over which tungsten carbide coating 19 is adhered. The tool body 15 is brazed to the tool shank as at 21 and it will be noted that the tool body 15 slightly overhangs the shank at 23 an arrangement which is required in many cutting operations.

The carbide body 5 and the carbide coated tool body 15 are each producible in apparatus such as shown in Figure 4. Initially the metal on which the carbide is to be deposited should be thoroughly cleaned; a preferred method is to abrade the metal with a wire wheel, then sand with fine Carborundum and then degrease in vapors of trichlorethylene.

The numeral 25 in Figure 4 indicates a hot air jacket which is illustrated by the dotted line. Supported within the air jacket and separately heated by steam coils 27 which pass through the jacket in any convenient manner is an oil bath 29. The bath has therein a closed container 31 which is suitably of steel and the container retains a supply of solid tungsten carbonyl crystals. The combination of bath 29 and container 31 form a vaporizer.

The numeral 33 indicates a longitudinally extending glass conduit and the conduit is surrounded with an induction heating coil 35 which is supplied from a source of energy (not shown). A suitable T-connector 37, the lower arm of which is sealed off communicates the plating chamber formed by conduit 33 with the container 31 through piping 39. Thus vaporized carbonyl may flow from the vaporizer to the plating chamber and a valve 41 in piping 39 controls this flow. Gage 40 indicates the pressure in the line.

The numeral 43 indicates a conduit which is connected exteriorly of the air jacket to a supply of hydrogen; valves 45 and 46 regulate the flow of $H_2$ to the plating chamber. T-connector 47 is provided on the upper end of conduit 33 for the passage of gases from the conduit 33 through arm 49 to T-connector 51. The upper end of connector 47 is sealed off at 53 and provides both a support for the object to be coated with the tungsten carbide and a passage for thermo couple leads to the object. Referring briefly to Figure 5 the closure 53 is inwardly provided with a member 55 welded to the closure; the member 55 has a depending arm 57 to the bottom of which the object 59 to be plated is secured. Thermo couple leads 61, 63 extend through the closure and are connected together at a convenient point on the object as at 65. This enables the object temperature to be determined and controlled through the induction heating means (not shown) supplying coil 35.

The T-connector 51 communicates through piping 67 with a condenser trap indicated generally at 69 and which functions to condense out of the exhaust gases from the plating chamber any undecomposed tungsten carbonyl. The trap 69 includes a base portion composed of connectors 71, 73 all of which are immersed in a coolant 77 i. e. water in tank 79.

Motor 81 drives a vacuum pump 83 which communicates through piping 85 having valve 87 with the upstanding piping 75.

An exhaust line 89 also leads from piping 75 to the atmosphere through valve 91.

Line 93 within the air jacket is provided with valves 95 and 97 and provides a convenient by-pass for the flow of tungsten carbonyl to the condenser trap; this by-pass is useful generally when plating operations are being initiated or terminated or during equipment adjustments.

In the practice of the invention the cleaned object is inserted into the equipment and the jacket brought up to temperature; at this time all valves are closed. Also energy is supplied to the induction coil 35 to bring the object up to a temperature of about 1000° F. The pump 83 is then operated with valve 87 opened and the system is pumped substantially free of air. With the pump thus operating valves 45 and 46 are opened and hydrogen is admitted to the system; at this time valve 87 is closed to develop hydrogen pressure and when the pressure of the hydrogen is atmospheric, valve 91 is opened to permit hydrogen to flow to the stack through line 89. Valve 91 is then closed as is valve 45 and the system is again evacuated. Preferably the flushing with hydrogen and evacuation is carried out two or three times to insure of substantial elimination of air; upon the last flushing with hydrogen the temperature of the workpiece is brought to the temperature at which plating is to take place—the temperature change being effected in the hydrogen atmosphere. Finally with valves 91, 45 and 41 in the closed position and valves 95, 97 and 87 open the system is again evacuated down.

Then with the pump operating and the components at temperature valve 41 is cracked open to permit tungsten carbonyl vapors to flow to the plating chamber. Valve 95 is gradually closed and flow of carbonyl to the workpiece occurs.

In one operation with the bath at 250° F.; the air jacket at 250° F.; and the system having been evacuated to a pressure of 50 microns of mercury to free it of air; with the workpiece at 775° F. plating temperature; a manometer reading of 3 mm. of mercury at a plating time of 25 minutes produced a coating 15 mils thick on the object. At the end of this period valves 87 and 41 as well as valve 95 are closed and the pump is shut off; the induction heating is also stopped. Valve 46 is then opened and the system brought to atmospheric pressure with hydrogen. Valve 91 is then opened and the object is flushed with hydrogen until it is cooled. Thereafter the hydrogen flow is shut off and the object removed.

The product of the operation is a smooth, bright plate, highly adherent to the metal of the object and somewhat brittle. Similar results were obtained at the following conditions:

| Run No. | Plating Temp., ° F. | Jacket Temp., ° F. | Vaporize Temp., ° F. | Time of Plating in Mins. | Mils of Tungsten Carbide | Pressure, mm. of Hg |
|---|---|---|---|---|---|---|
| 1 | 1,000 | 250 | 250 | 25 | 38 | 3 |
| 2 | 800 | 250 | 250 | 10 | 15 | 3 |
| 3 | 770 | 250 | 250 | 15 | 12 | 3 |
| 4 | 680 | 230 | 300 | 80 | 11 | 0.5 |
| 5 | 650 | 230 | 270 | 30 | 5 | 0.5 |

The plating rate increases materially with the higher temperatures and somewhat large crystals tend to be formed at the higher temperature.

Metals on which the tungsten carbide may be deposited include as well as the steels, copper and nickel. Nickel itself may be first deposited from its carbonyl onto the tool metal and the carbide applied to the nickel if so desired. Similarly copper coated base metals may have the tungsten carbide applied thereto.

X-ray diffraction analyses of the carbide coatings indicate that if the pressure is maintained above 3 mm. of mercury the product is tungsten carbide; higher pressures up to atmospheric contribute to tungsten carbide formation. At lower pressures, that is about 5 mm. tungsten metal is obtained in the product to an extent not exceeding about 10% by weight and decreasing with temperature and flow rate increase.

The fluorescent X-ray emission spectrum by comparison with the spectrum of a bar of tungsten, and chemical analysis, indicate that the product of the above examples at temperatures of and above 770° F. are substantially completely carbide and a mixture of $W_2C$ and WC; such includes cubic WC and hexagonal WC with $W_2C$. The loss on heating in hydrogen for about 12 hours in some samples has run as high as 6% but is generally less indicating a WC, $W_2C$ composition.

It will be understood that this invention is susceptible to modification in order to adopt it to different usages and conditions and accordingly, it is desired to comprehend such modifications within this invention as may fall within the scope of the appended claims.

We claim:

1. A process of gas plating a mixture of tungsten carbonyl and tungsten metal onto a metal body which consists in heating the body in an evacuated atmosphere to a temperature between about 650° F. and 680° F., and not over 770° F., and then contacting a hot surface of the body with gaseous tungsten carbonyl at a pressure of about 3 millimeters whereby there is deposited a coating of tungsten carbide together with tungsten metal, the latter being present in a minor amount up to 10% by weight.

2. A metal body gas plated in accordance with the process of claim 1.

References Cited in the file of this patent

UNITED STATES PATENTS

| 1,974,215 | Kilmer | Sept. 18, 1934 |
| 2,053,977 | Taylor | Sept. 8, 1936 |
| 2,540,623 | Law | Feb. 6, 1951 |
| 2,677,627 | Montgomery et al. | May 4, 1954 |

FOREIGN PATENTS

| 589,977 | Great Britain | July 4, 1947 |